United States Patent Office 2,907,710
Patented Oct. 6, 1959

2,907,710

REMOVAL OF SULFUR, NITROGEN, AND OXYGEN COMPOUNDS WITH ORGANIC ISOCYANATE AND WATER

Abraham Schneider, Overbrook Hills, Pa., assignor to Sun Oil Company, Philadelphia, Pa., a corporation of New Jersey No Drawing. Application July 18, 1955
Serial No. 522,829

8 Claims. (Cl. 208—236)

The present invention relates to a novel process for refining petroleum, and more particularly to a novel manner of converting nonhydrocarbon constituents of petroleum materials.

Various petroleum materials contain substantial amounts of nonhydrocarbon compounds having objectionable properties which materially reduce the value of the various products obtained unless steps are taken to eliminate these compounds or convert them into a less objectionable form. These nonhydrocarbon constituents include various organic compounds containing sulfur, nitrogen or oxygen in the molecule.

A particularly objectionable instance of the disadvantageous effects of nonhydrocarbon constituents of petroleum is the case of gasoline or other light petroleum fractions containing mercaptans which impart an undesirable odor to the fraction, as well as poor lead susceptibility. Another instance of the objectionable effect of nonhydrocarbons is the case of lubricating oils which have poor oxidation stability caused by nonhydrocarbon constituents of the lubricating oil.

The present invention provides a novel and advantageous manner in which nonhydrocarbon constituents of petroleum can be chemically converted into materials which have less objectionable properties, or into materials which are more readily removed from the petroleum than the original nonhydrocarbon constituents.

The treatment according to the invention involves the contacting of petroleum containing nonhydrocarbon constituents with an organic isocyanate in order to react the latter with nonhydrocarbon constituents of the petroleum charge. It has been found that the properties of various petroleum fractions can be substantially improved by such treatment, the reaction products being either allowed to remain in the treated petroleum material or removed therefrom in a suitable fashion, for example by distillation, solvent extraction, treatment with an adsorbent material to selectively remove the reaction products, etc.

Any suitable isocyanate-nonhydrocarbon reaction conditions may be employed in the treatment according to the invention. Such conditions include the use of elevated temperature or the use of a catalyst to promote the reaction, or both. Temperatures within the approximate range from 150° F. to 500° F. are elevated temperatures which generally promote the desired reaction. It is to be noted however that the use of elevated temperatures may be undesirable in some cases because of the danger of discoloration of the petroleum material as a result of the elevated temperatures. Therefore, in such cases, it may be preferred to use lower temperatures and accomplish the promotion of the reaction by use of a suitable catalyst. It is within the ability of a person skilled in the art, in the light of the present specification, to determine for a particular petroleum charge the temperature conditions which should be employed. In any event, it is preferred to use a catalyst in the process according to the invention.

Suitable catalysts for use in promoting the reaction of the treating agent with nonhydrocarbon constituents of the petroleum charge include for example aqueous catalysts and alkaline catalysts. Thus for example water alone can be employed to catalyze the reaction. It should be noted in this connection that isocyanates in general tend to decompose in the presence of water, and therefore the contacting of the treating agent with water should be essentially concurrent with the contacting of the petroleum with the treating agent, in order that excessive decomposition of the treating agent should not occur prior to the contacting of the treating agent with the petroleum charge. If desired, a surface active agent can be employed with the water, for example a non-ionic agent such as an alkyl phenyl ether of polyethylene glycol, or an anionic agent such as an alkali metal alkyl benzene sulfonate, or a cationic agent such as an alkyl pyridinium chloride, etc.

When an alkaline catalyst is employed, the catalyst is preferably strongly alkaline, i.e. having dissociation constant at 25° C. of at least about $10^{-5}$. Preferred alkaline catalysts are aqueous solutions of inorganic alkaline materials such as ammonium hydroxide, sodium hydroxide, potassium hydroxide, sodium carbonate, potassium carbonate, etc.; preferred concentrations of such solutions are 5 to 50 percent. Aqueous suspensions of inorganic alkaline materials can also be employed, for example aqueous suspensions of alkaline earth metal oxides such as calcium oxide, magnesium oxide, etc. Substantially anhydrous inorganic alkaline materials can also be employed, such as solid alkaline earth metal oxides or alkali metal hydroxides or carbonates, or carriers such as clay impregnated with aqueous solutions of alkaline materials, etc. Organic alkaline materials can also be employed, for example dimethylamine, trimethylamine, diethylamine, triethylamine, dibutylamine, diamylamine, quaternary bases such as alkyl pyridinium hydroxides, etc. Other catalysts capable of promoting reaction between isocyanates and nonhydrocarbon materials can be employed. Preferred temperatures for use in conjunction with a catalyst are those within the approximate range from 30° F. to 200° F.

The isocyanate treating agent is employed according to the invention in a minor amount, preferably within the approximate range from 0.001 weight percent to 5 weight percent based on the petroleum charge, and more preferably 0.01 weight percent to 1 weight percent. In the case where an alkaline catalyst is employed, the amount is preferably within the approximate range from 0.5 to 25 parts by volume of catalyst per 100 parts of petroleum charge, the amount more preferably being within the range from 1 to 15 parts by volume per 100 parts of petroleum charge. In the case of water alone being used to catalyze the reaction, the amount employed is preferably within the approximate range from 10 to 150 volume percent based upon the petroleum charge.

The treating agent employed according to the invention is an organic isocyanate having at least one —NCX radical in the molecule, where X is sulfur or oxygen. Such organic isocyanates are generally suitable for use as treating agents according to the invention. Preferred treating agents are those having the formula RNCX where R is selected from the group consisting of alkyl radicals, aryl radicals, cycloalkyl radicals, alkyl radicals having at least one NCX substituent, aryl radicals having at least one NCX substituent and cycloalkyl radicals having at least one NCX substituent, and where X is sulfur or oxygen. Preferably R contains 1 to 15 carbon atoms. Examples of suitable treating agents for use according to the invention are phenyl isocyanate, tolyl isocyanates, naphthyl isocyanates, phenylene diisocyanates, biphenylene diisocyanates, bitolylene diisocyanates, methyl isocyanates, butyl isocyanates, octyl isocyanates, ethylene diisocyanate, hexylene diisocyanates, cyclohexyl isocyanate, methyl cyclohexyl isocyanate, cyclohexylene diisocyanates, the isocyanate radicals in the above compounds being either NCS or NCO radicals, etc.

The treatment according to the invention is applicable to petroleum materials generally which contain non-hydrocarbon constituents. Examples of petroleum materials which can be beneficially treated according to the present invention are natural gas, refinery gases, liquefied petroleum gases, gasoline, kerosene, spirits, gas oil, furnace oil, diesel fuel, jet fuel, lubricating oil, spindle oil, crude oil, etc.

When an excess of the treating agent is employed in the process according to the invention, the excess treating material is preferably removed as completely as possible from the treated petroleum material, since at least some isocyanates have objectionable odors if left in sufficient quantities in the treated petroleum. The removal can generally be accomplished without particular difficulty, in view of the fact that the treated petroleum will generally contain sufficient water to accomplish decomposition of the treating agent. Excess treating agent can also be removed by washing with a suitable solvent, e.g. aqueous methanol, or by distillation in the case where the treating agent is sufficiently lower boiling than the charge, etc.

In one embodiment of the invention, an isocyanate is used as a regenerating agent for an alkaline treating agent which has been previously used to remove mercaptans, hydrogen sulfide, or both from a petroleum material, and which contains sodium mercaptides, sodium sulfide or both, formed in the alkaline treating agent during the contacting with petroleum. The use of the isocyanate in this embodiment involves reaction thereof with the mercaptides or sulfide or both to form reaction products which may if desired be removed from the treating agent prior to re-use of the latter to contact additional petroleum. Alternatively, the reaction products can if desired be left in the regenerated treating agent, in which case they frequently provide a beneficial effect in increasing the solubility of mercaptans in the regenerated treating agent. The amount of isocyanate employed in the regeneration is preferably within the range from 0.01 to 10 parts by weight per 100 parts of treating agent, more preferably 0.1 to 5 parts per 100, and temperatures from 30° F. to 200° F. are preferably employed.

The following examples illustrate the invention:

*Example I*

A straight run gasoline containing 15.0 mg. of mercaptan sulfur per liter was contacted with phenyl isocyanate in the presence of a 10 percent aqueous solution of sodium hydroxide, in order to effect a conversion of mercaptans in the gasoline. Various runs were made employing different amounts of phenyl isocyanate as indicated in the following table. In each run 10 volumes of the sodium hydroxide solution were employed per 100 volumes of gasoline. The treatment was accomplished by adding phenyl isocyanate to the gasoline and shaking the resulting gasoline together at room temperature with the sodium hydroxide solution for 5 minutes, then separating the treated gasoline from the sodium hydroxide solution and determining the mercaptan content of the separated gasoline by electrometric titration with aqueous silver nitrate. In order to determine the effect of the phenyl isocyanate, as distinguished from the effect of the sodium hydroxide solution itself, one run was made wherein no phenyl isocyanate was employed, the conditions of treatment being otherwise the same. The following table shows the results obtained, the first run being the run in which no phenyl isocyanate was employed.

| Run No. | Volume Percent of Phenyl Isocyanate | Mercaptan Sulfur in Product |
|---|---|---|
| 1 | None | 6.54 |
| 2 | 0.01 | 5.89 |
| 3 | 0.02 | 4.61 |
| 4 | 0.05 | 2.94 |
| 5 | 0.10 | 2.05 |
| 6 | 0.20 | 1.60 |
| 7 | 0.50 | 0.77 |

The amounts of phenyl isocyanate in the above table are reported in volume percent based on the gasoline charge. The mercaptan sulfur contents of the product are reported in milligrams per liter.

The above table shows that the use of phenyl isocyanate is effective to produce a considerably greater reduction of mercaptan content than is obtained by the use of aqueous sodium hydroxide in the absence of the phenyl isocyanate, and that increasing amounts of phenyl isocyanate produce an increase in the extent of reduction of mercaptan content.

*Example II*

Experiments similar to those performed in Example I were carried out, employing water as a catalyst in place of the sodium hydroxide employed in Example I. 100 volumes of water per 100 volumes of gasoline were employed. The following table shows the results obtained:

| Run No. | Volume Percent of Phenyl Isocyanate | Mercaptan Sulfur in Product |
|---|---|---|
| 1 | None | 15.0 |
| 2 | 0.50 | 3.71 |

The above table shows that the use of water alone is ineffective to produce any reduction in the mercaptan content of the gasoline, whereas the use of phenyl isocyanate in conjunction with the water produces a large reduction in the mercaptan content of the gasoline.

The presence of water or other catalyst is essential for satisfactory results in a room temperature treatment, no substantial reduction in mercaptan content being obtained using phenyl isocyanate alone under conditions otherwise the same as in Example II.

The invention claimed is:

1. Process for converting nonhydrocarbon constituents of petroleum which comprises: contacting petroleum containing nonhydrocarbon constituents selected from the group consisting of organic oxygen, sulfur, and nitrogen compounds with a minor amount of an organic isocyanate in the presence of a catalyst consisting essentially of water.

2. Process according to claim 1 wherein said contacting is performed at a temperature in the approximate range from 30 to 200° F.

3. Process for converting nonhydrocarbon constituents of petroleum which comprises: contacting petroleum containing nonhydrocarbon constituents selected from the group consisting of organic oxygen, sulfur, and nitrogen compounds with a minor amount of a reagent having the formula RNCX where R is selected from the group consisting of alkyl radicals, aryl radicals, cycloalkyl radicals, alkyl radicals containing at least one NCX substituent, aryl radicals containing at least one NCX substituent and cycloalkyl radicals containing at least one NCX substituent, and where X is sulfur or oxygen, in the presence of a catalyst consisting essentially of water.

4. Process according to claim 3 wherein said reagent is phenyl isocyanate.

5. Process for reducing the mercaptan content of gasoline which comprises: contacting gasoline containing nonhydrocarbon constituents selected from the group consisting of organic oxygen, sulfur, and nitrogen compounds with 0.001 to 5 weight percent of phenyl isocyanate in the presence of 10 to 150 volume percent of a catalyst consisting essentially of water.

6. Process for converting nonhydrocarbon constituents of petroleum which comprises: contacting petroleum containing nonhydrocarbon constituents selected from the group consisting of organic oxygen, sulfur, and nitrogen compounds with a minor amount of an organic isocyanate under isocyanate-nonhydrocarbon reaction conditions in the presence of water and a surface active agent selected from the group consisting of alkylphenyl ethers of polyethylene glycol, alkali metal alkyl benzene sulfonates, and alkyl pyridinium chlorides.

7. Process for converting nonhydrocarbon constituents of petroleum which comprises: contacting petroleum containing nonhydrocarbon constituents selected from the group consisting of organic oxygen, sulfur, and nitrogen compounds with a minor amount of an organic isocyanate and a surface active agent selected from the group consisting of alkylphenyl ethers of polyethylene glycol, alkali metal alkyl benzene sulfonates, and alkyl pyridinium chlorides, in the presence of a catalyst consisting essentially of water.

8. Process for refining petroleum which comprises: contacting petroleum containing nonhydrocarbon constituents with an alkaline treating agent, thereby to form compounds selected from the group consisting of alkali metal mercaptides and alkali metal sulfides; separating the treating agent containing said compounds from the petroleum; and contacting the separated treating agent with a minor amount of an organic isocyanate, thereby to react said isocyanate with said compounds and regenerate the treating agent.

References Cited in the file of this patent
UNITED STATES PATENTS

| | | |
|---|---|---|
| 2,411,105 | Nixon et al. | Nov. 12, 1946 |
| 2,701,784 | Cauley | Feb. 8, 1955 |
| 2,723,944 | Chenicek | Nov. 15, 1955 |